Inventor
Herbert Krause by Parker & Carter
Attorneys

March 10, 1959 H. KRAUSE 2,877,039
DECK LATCH STRUCTURE
Filed Sept. 5, 1956 3 Sheets-Sheet 3

Inventor
Herbert Krause
by Parker & Carter
Attorneys

United States Patent Office 2,877,039
Patented Mar. 10, 1959

2,877,039

DECK LATCH STRUCTURE

Herbert Krause, Chicago, Ill., assignor to Chicago Forging and Manufacturing Company, Chicago, Ill., a corporation of Delaware Application September 5, 1956, Serial No. 608,043

6 Claims. (Cl. 292—216)

This invention relates to deck latches for vehicles and the like and has particular relation to a deck latch usable in association with luggage compartment closures of automobiles.

One purpose of the invention is to provide a deck latch which shall incorporate simplicity of design along with economy of manufacture and a maximum in trouble-free operation.

Another purpose is to provide a latch of a type described which shall insure security of latching engagement between the parts to be latched.

Another purpose is to provide a latch of a type described and a housing therefor.

Another purpose is to provide a deck latch and housing in combination with a particular latch engaging structure for cooperation therewith.

Another purpose is to provide a deck latch and a protective and guiding housing therefor.

Another purpose is to provide a deck latch in combination with a locking and release structure.

Another purpose is to provide a deck latch wherein the latching mechanism is enclosed within a protective and guiding housing.

Other purposes will appear from time to time during the course of the specification and claims.

I illustrate my invention more or less diagrammatically in the accompanying drawings wherein—

Like parts are indicated by like numerals throughout the specification and drawings.

Figure 1:
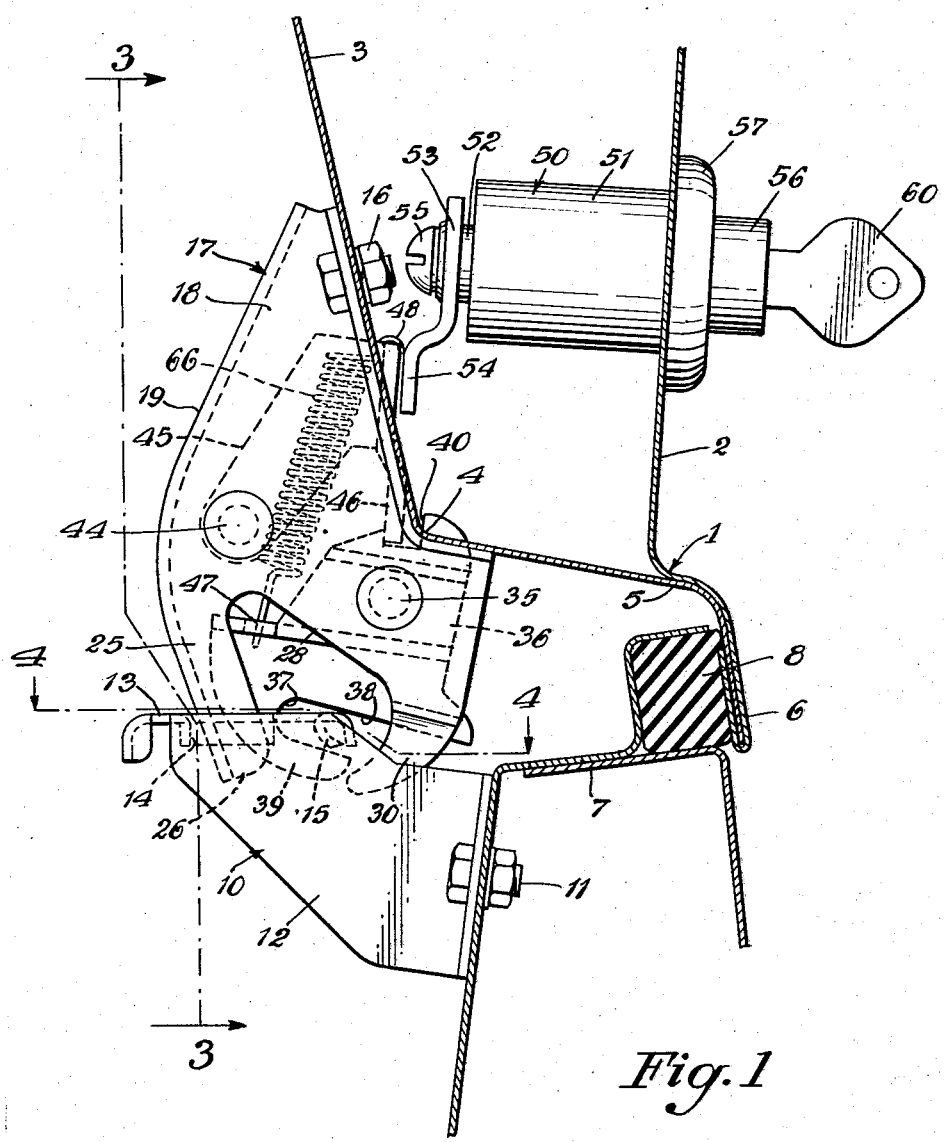
Figure 1 is a side elevation of my invention.
Figure 2:
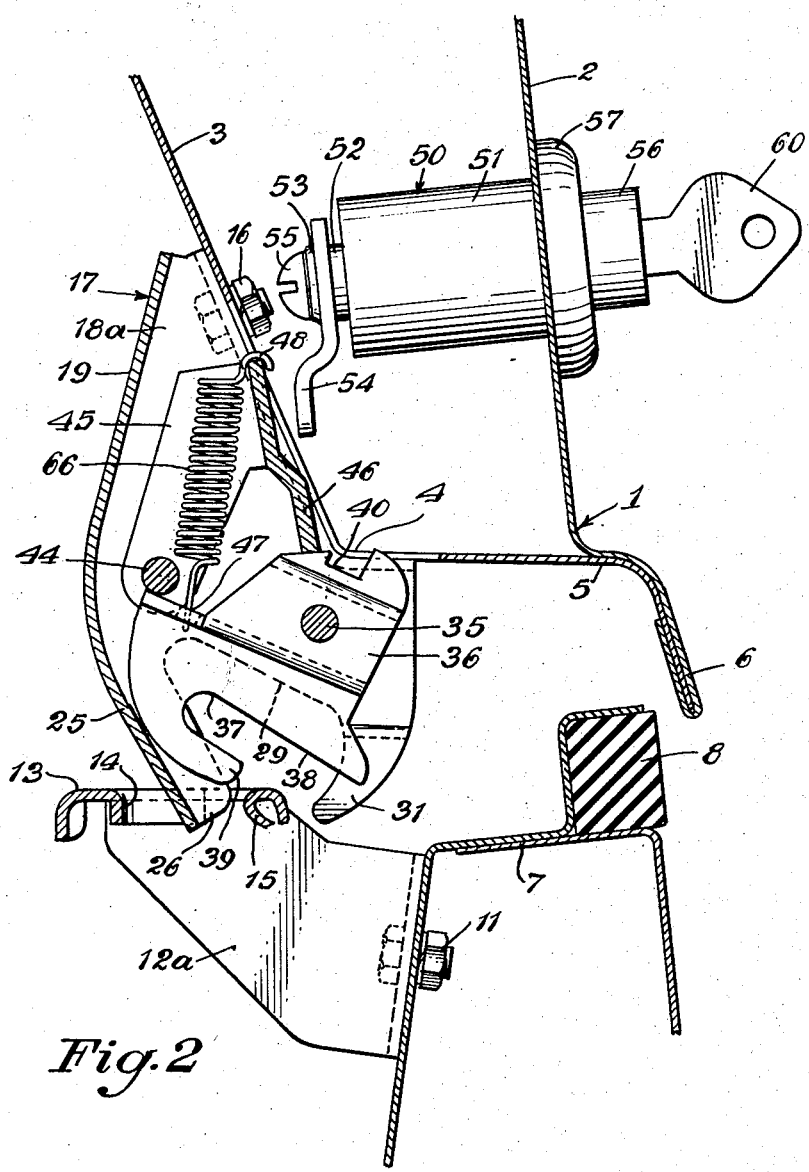
Figure 2 is a view similar to that of Figure 1 and illustrating the parts of my invention in a different position.

Referring now to the drawings and particularly to Figure 1, an automobile rear or luggage compartment deck lid is indicated generally at 1. While, for convenience, I illustrate my invention in association with an automobile luggage compartment closure or lid, it will be understood that the structure of my invention may be employed with a variety of elements to be latched without departing from the nature and scope of my invention. The closure or lid 1 may, as is common practice, be formed of an outer deck lid panel 2 and an inwardly spaced inner panel 3. The panel 3 may be directed outwardly adjacent its lower edge as at 4 to join the outer panel 2 along its lower edge as at 5 and to form the lower lip 6. The automobile body may have a cooperating ledge or support element 7 positioned beneath the deck 1. The body portion 7 may carry along its upper rear edge a bumper element 8 which may for example be comprised of resilient material such as rubber to provide a shock absorbing abutment for engagement by the lip 6 of the deck lid 1.

Secured to the body portion or lower panel 7 and extending inwardly therefrom, I provide a catch member generally indicated by the numeral 10. The member 10 may be joined to the portion 7 by any suitable securing elements such as the nut and bolt structure shown at 11. A pair of spaced side plates 12, 12a extend inwardly from the body portion 7 and are upwardly inclined therefrom adjacent their rearmost edges. The sides 12 are joined by an upper horizontally disposed plate portion 13 having the latch receiving aperture 14 formed therein. A portion of the plate 13 along the outer laterally directed edge of the aperture 14 may have its upper edges somewhat rounded to form a keeper or latch engaging element 15.

Secured to the rear surface of the inner panel 3 as by securing elements 16 is a latch housing member 17. The member 17 may comprise a pair of spaced side plates 18, 18a extending rearwardly of the panel 3 and joined by a rear cross-plate 19. It will be understood that the plates 18, 18a and 19 form with the inner panel 3 a complete housing for the latch structure to be described with the exception of excess areas provided in said housing as will be further described below.

The housing 17 has its aft-wall 19 and side walls 18, 18a downwardly depending and inwardly curved along the rear edges of the side wall to form a latch protecting and guiding segment 25. The side walls 18, 18a are inwardly bent at the lower edges of the portion 25 as indicated at 26, 27. The side walls, 18, 18a, have their lower portions recessed on opposite sides of a latch element as indicated at 28, 29, the recess opening being defined by the portion 25 and an oppositely spaced inwardly directed latch protecting and guiding segment 30, 31.

Pivotally mounted in the spaced side walls 18, 18a of the housing 17, as at 35, is a latch member 36. The latch member 36 has a latching slot or recess 37 bounded along one side by a keeper-engaging and latch-actuating elongated straight edge 38 and along its opposite side by a curved hook or retaining portion 39. With the latch 36 in non-latching position, the latching slot or recess 37 is normally substantially, downwardly open to receive the catch or keeper 15 as will be further described below.

The latch 36 has formed in its opposite edge, spaced beyond the pivot 35 from the latching slot 37, a locking recess or slot 40.

Pivotally mounted in the side walls 18, 18a of the housing 17, as at 44, is a latch retaining or locking element 45 having an abutment or bar portion 46 formed and adapted to fit in locking engagement within the slot 40 of the latch 36. A single yielding means such as the spring 66 is connected at one end to the latch 36 as at 47 and at its opposite end to the locking element or lever 45 as at 48.

A latch releasing means is indicated generally by the numeral 50 and may comprise a sleeve or chamber or housing 51 in which is slidably mounted a bolt or shaft 52. The shaft 52 carries at its inner end 53 a release abutment element 54 which may be secured to the bolt 52 by any suitable means such as the bolt 55. The shaft 52 has a portion 56 extending through the rear deck lid panel 2, a collar element 57 being provided to aid in retaining the member 50 on the panel 2. The portion 56 may for example comprise a security element operable, as is well known, by a key 60. The key 60 may be employed to release the securing element within the portion 56 to permit the shaft 52, which is slidably mounted in the element 50, to be pressed or pushed inwardly to cause the abutment 54 to move the release element 45 in a counterclockwise direction, as the parts are shown in Figure 1, and thereby to lift the locking bar portion 46 out of the slot 40 and thus to release the latch 36 from latching engagement.

Whereas I have described and claimed a practical and operative device, nevertheless, many changes may be made in the size, shape, number and disposition of parts without departing from the spirit of my invention. I therefore wish my description and drawings to be taken as in a broad sense, illustrative or diagrammatic, rather than as limiting me to my precise showing.

The use and operation of my invention are as follows:

As the deck lid 1 is brought downwardly toward the rail or support 7, the edge 38 of the latch 36 is brought into contact with the keeper or latching bar 15 fixed on the body portion 7. Continued movement of the deck 1 in a downward direction causes rotation of the latch 36 in a counterclockwise direction, as the parts are shown in Figure 1, and a consequent movement of the latching portion 39 into position beneath the bar 15, the edge 38 being longer to provide for continued engagement as the parts move toward closed position. At the same time rotation of the latch 36 in counterclockwise direction moves the slot 40 into position beneath the bar 46 on the element 45 permitting the bar to enter the slot 40 and thus to lock the latch 36 in latching position. It will be observed that latch 36 and lever 45 are held in continuous contact by spring 66 and that bar 46 automatically engages slot 40 upon rotation of latch 36 into latching position. Since the portions 30, 31 are inwardly directed and the locking portion 39 is of sufficient linear extension to bridge the mouth of the recess 28, 29 in the housing 17, it will be observed that a positive locking engagement about and substantially surrounding the bar 15 is created, the bar 15 being surrounded by the opposite walls of the slot 37, the inner curved edge of the slot 37, and the inner curved edges of the portions 30, 31.

It will be observed that a single spring 66 is effective to produce a positive urging of the latch 36 toward nonlatching position and a much less positive or forceful urging of the lock lever 45 into locking engagement with the latch 36. The spring 66 is positioned in a plane passing between the pivot points 35, 44. At the same time the plane of the action of the spring 66 forms substantially a tangent to the arc of rotation to the latch 36 and the full force of the spring 66 is therefore exerted toward rotational pressure on the latch 36 toward nonlatching engagement. The spring 66 engages the element 45 however in a plane only slightly inclined from a radius of rotation about the pivot 44 of the element 45. Since the engagement of the bar 46 in the slot 40 is a positive engagement fully effective to prevent accidental rotation of the latch 36 out of latching engagement, substantial urging of the spring 66 is not necessary to retain the bar 46 in the slot 40. Thus a minimum of resistance is presented to the release shaft 52 and to the operator who has unlocked, by means of the key 60, the releasing element 50 and who thereafter is free to press the element 56 and thereby the shaft 52 inwardly, against the limited action of the spring 66, to release the locking element 45 from the latch 36, the spring 66 being thereafter effective to snap with full positive action the latch 36 into nonlatching position.

As the latch 36 is snapped into nonlatching position the edge 38 of the latch 36 is directed forcibly against the bar 15 as the latch 36 and edge 38 are rotated. Thus is produced an initial upward movement or kick-up of the housing 17 and the deck lid 1 to which it is attached to fully disengage the latch 36 from the bar 15 and the portions 30, 31 and 26, 27, 25 from the catch housing 10.

Figure 3:
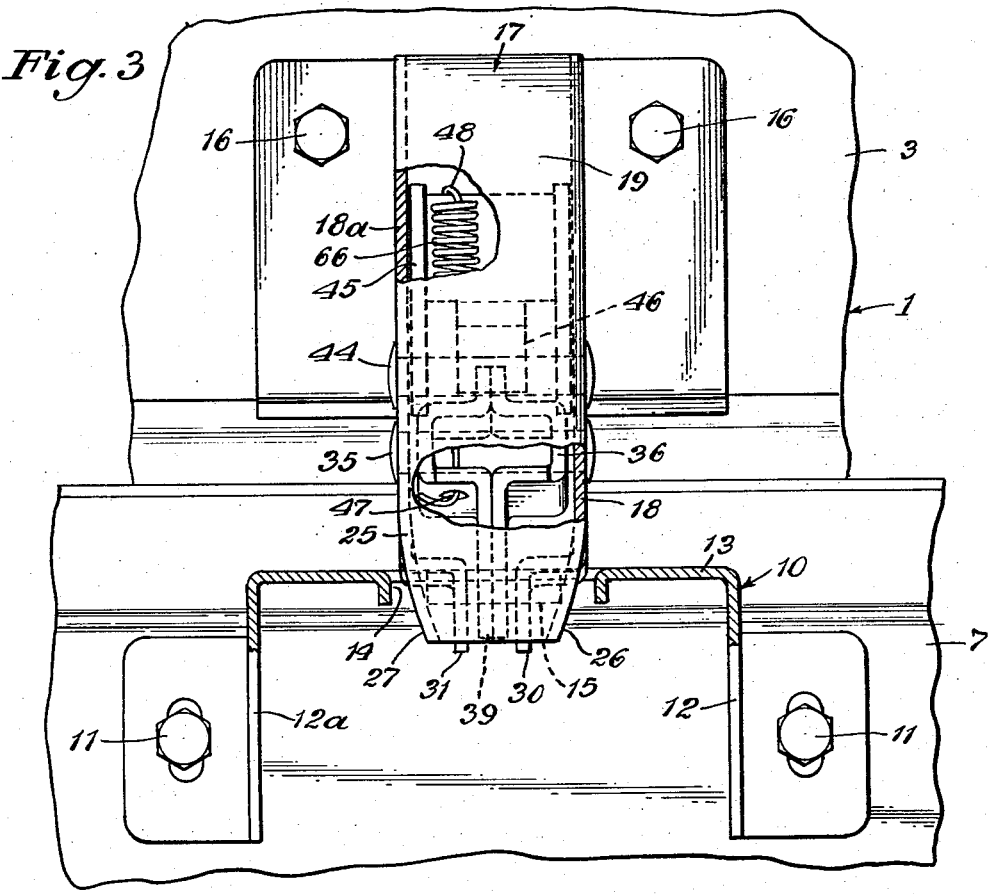
Figure 3 is a cross-sectional view taken on the line 3—3 of Figure 1.
Figure 4:
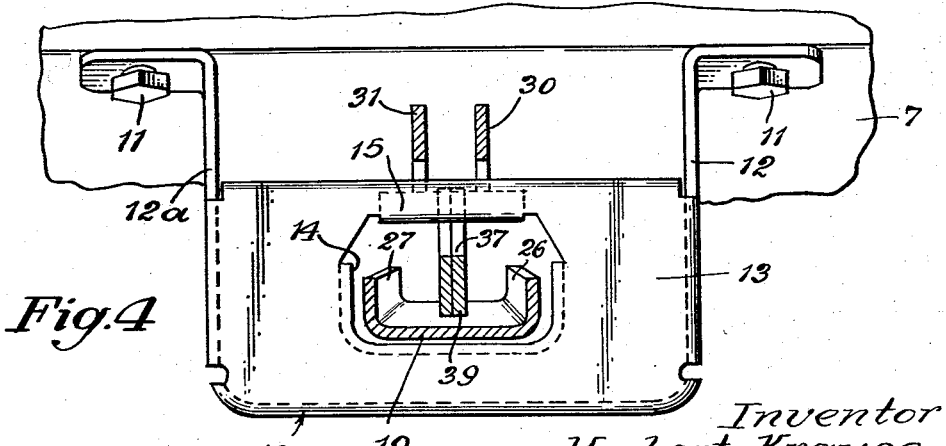
Figure 4 is a view taken on the line 4—4 of Figure 1.

The housing extensions or portions 25, 26, 27, 30, 31, additionally serve as guide means for the latch structure of my invention positioned to enter the housing 10 prior to contact of the latch edge 38 with the keeper bar 15. These guide elements further protect the latch 36 and, as best seen in Figure 3, prevent undue sideward motion of the deck lid.

I claim:

1. In a deck latch structure for automobiles and the like having a lower frame portion and a movable deck lid movable into closing engagement with said frame portion, a first housing fixed on said frame portion, said first housing having a latch receiving aperture, a fixed keeper bar on said first housing dividing said aperture, a second housing fixed on said deck lid, said second housing comprising a pair of spaced walls and a cross wall joining said spaced walls, a latch rotatably mounted within said second housing for rotation about an axis positioned laterally of said housing and extending between the side walls thereof, said side walls having spaced, lower, downwardly depending latch-protecting-and-guiding portions, said latch having a latching slot rotatable into a position receiving said keeper bar within said slot in response to engagement of said keeper bar with a wall of said slot, said latch being entirely rotatable within said housing, one of said latch-protecting-and-guiding portions cooperating with said latching slot to substantially encircle said keeper bar when said latch is in latching position, said spaced latch-protecting-and-guiding portions being effective to enter said first housing on opposite sides of said keeper bar when said deck lid is moved toward closed position on said frame portion, prior to said engagement of said keeper bar with said latching slot wall.

2. The structure of claim 1 characterized by and including a locking element pivotally mounted within said second housing for rotation about an axis extending laterally of said second housing between said housing side walls, said locking element having a locking portion engageable with said latch to lock said latch in latching position and yielding means within said second housing connected at one end to said latch and at its opposite end to said locking element, said yielding means being effective simultaneously to urge said latch toward nonlatching position and to urge said locking element toward locking engagement with said latch.

3. The structure of claim 2 wherein said yielding means constitutes a coil spring having one of its ends secured to an edge of said latch and its opposite end secured to the outer end of said locking element, said spring being secured to said latch for action tangentially of the arc of rotation of said latch and to said locking element for action substantially radially of said locking element.

4. In a latching structure for use in latching together a movable and a fixed member, a latch housing mounted on one of said members, a retainer member mounted on the other of said members, said retainer member having a latch-engaging element thereon and guide-receiving openings on opposite sides of said element, said latch housing having a latch rotatably mounted for rotation entirely within said latch housing, said latch housing having spaced guide means adapted to enter each of said openings prior to contact of said latch-engaging element with said latch.

5. The structure of claim 4 characterized by and including a segment on said latch formed and adapted and rotatable into position to bridge the space between said guide means when said latch is in latching position.

6. In a latch structure for deck lids and the like, a housing, a latch rotatably mounted in said housing, yielding means in said housing to urge said latch toward nonlatching position, said housing having wall members constituting guide portions extending beyond the area of rotation of said latch in the direction of movement of the deck lid toward closing position, said guide portions being positioned on opposite sides of said latch and defining a keeper receiving-opening in said housing, said keeper receiving-opening facing the direction of movement of the deck lid toward closing position, said guide portions having inwardly curved converging outer edge surfaces, and a fixed keeper member having a transversely disposed keeper bar positioned to enter said opening and to contact said latch after entering said opening in response to movement of the deck lid toward closing position, said keeper member having fixed portions defining openings on opposite sides of said keeper bar, each of said last-named openings being positioned to receive one of said guide portions.

References Cited in the file of this patent

UNITED STATES PATENTS

| | | |
|---|---|---|
| 556,932 | Keeler | Mar. 24, 1896 |
| 2,246,787 | Dall | June 24, 1941 |
| 2,608,428 | Allen | Aug. 26, 1952 |
| 2,634,147 | Robertson | Apr. 7, 1953 |
| 2,727,774 | Marple et al. | Dec. 20, 1955 |
| 2,767,571 | Dingman | Oct. 23, 1956 |

FOREIGN PATENTS

| | | |
|---|---|---|
| 1,077,170 | France | Apr. 28, 1954 |